Feb. 23, 1960   J. M. CAUGHEY   2,925,855
SPRING ELEMENT FOR CUSHION SPRING STRUCTURE
Filed Nov. 4, 1957

INVENTOR
John M. Caughey
BY Beaman & Beaman
ATTORNEY

United States Patent Office 2,925,855
Patented Feb. 23, 1960

2,925,855

SPRING ELEMENT FOR CUSHION SPRING STRUCTURE

John M. Caughey, Adrian, Mich., assignor to Stubnitz Greene Corporation, Adrian, Mich., a corporation of Michigan Application November 4, 1957, Serial No. 694,351

3 Claims. (Cl. 155—179)

The present invention relates to improvements in spring wire elements for spring cushion structure of the type having a main bridging portion with terminal support portions for attachment to spaced frame parts.

The main bridging portion of this type of spring element may be of so-called zig zag construction of relatively large radius or with right angle bents of smaller radius and designated as formed wire type, or the bridging portion may be of so-called stringer type disclosed in co-pending applications Serial No. 561,470, filed January 26, 1956, now Patent No. 2,871,922, and Serial No. 633,883, filed January 14, 1957, now Patent No. 2,871,923.

Spring elements of the several types above mentioned are conventionally provided at the front of seat cushions and at the top of back cushions with a fish mouth form between the main bridging portion and point of attachment with the frame part. The present invention is specifically concerned with the improvement of this fish mouth form.

It has been found that in a very thin cushion that maximum resilient support and satisfactory riding comfort may be obtained if the fish mouth form is such that full advantage may be taken of the torsional capacity of the spring wire from which the spring element is fabricated. According to the invention this has been accomplished by merging a linear spring portion into a fish mouth defined by a series of right angle bends all taken in the same direction and defining a convolution having spaced parallel torsion bar portions disposed at right angles to the linear spring portion.

Thus, an object of the invention is to provide a spring element of the type disclosed having an improved fish mouth form which is especially adapted for use where the cushion or back must be held to minimum thickness as, for example, over a floor tunnel of a passenger automobile.

These and other objects and advantages of the present invention residing in the specific details of construction and combination of structure will more fully appear from the following specification and claims.

Figure 1:
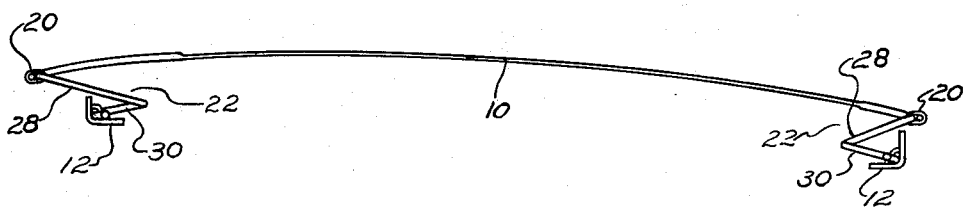
Fig. 1 is a fragmentary plan view of a spring cushion structure embodying the present invention.
Figure 2:
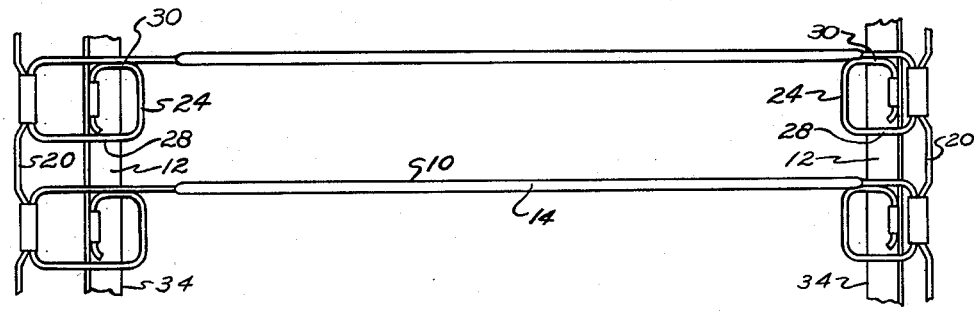
Fig. 2 is a side elevational view of Fig. 1.
Figure 3:
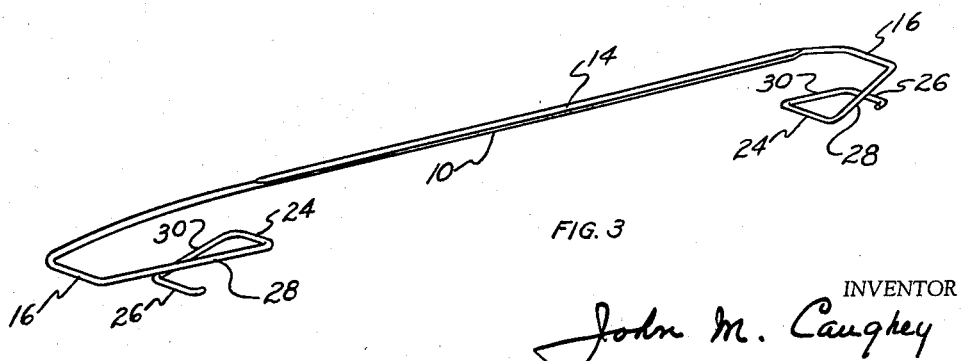
Fig. 3 is a perspective view of the improved spring element shown removed from the construction.

Referring to the drawings, the spring element 10 is shown in Fig. 1 extending between the base frame parts 12. A linear portion 14 of substantially straight spring wire is shown provided with terminal torsion bar portions 16 which are clipped to the upper border frame 20 of the spring cushion structure.

The fish mouth portions 22 at opposite ends of the spring element 10 are defined by integral extensions of the torsion bar portions 16 and take the form of spaced substantially right angle bends all made in the same direction to provide a convolution having portions 24 and 26 parallel to the torsion bar portion 16 with sides 28 and 30 sloping in opposite directions and parallel to the linear portion 14. The portions 24 are torsion bar portions while the portion 26 defines attachment feet held in position by clips 32 formed, in practice, from the frame parts 12.

Upon deflection loading of the spring element 10, following the initial movement, the side 30 will engage the rails 34 of the frame parts 12 and torsional stresses will be set up in the torsion bar portions 16 and 26 to augment the resilient supporting properties of the linear spring portion 14.

It will be understood that the fish mouth portions 22 may be used at only one end of the spring element 10 and may be readily fabricated in production for the reason that all bends in their formation are in the same direction. By varying the relative slope of the sides 28 and 30, the height of the spring element 10 may be conveniently varied and the torsional function of the portions 16 and 26 are retained. Thus, the improved spring element may be employed to advantage in thin spring cushion construction as well as in localities in cushions of standard thickness where obstructions and clearances beneath the seat or behind the back necessitate a reduction in cushion depth as, for example, the obstruction offered by the floor tunnel in passenger automobiles.

Having thus described my invention what I claim as new and desire to cover by Letters Patent is:

1. A spring element for spring cushion constructions for use in vehicle seats and backs and the like comprising a main bridging portion having terminal supporting ends, at least one of said ends being in the form of a fish mouth and having a first transverse torsion bar portion immediately adjacent one end of said main bridging portion and to which the top border frame of the spring cushion construction is adapted to be attached, a first side sloping inwardly from said first bar to define a part of the fish mouth form and disposed at a plane substantially parallel to the plane of deflection of said bridging portion, a second transverse torsion bar in spaced substantially parallel relation to said first bar, a second side disposed in a plane substantially parallel to said first side and angularly disposed to said first side and oppositely directed to define another part of the fish mouth form and terminating in an attachment foot portion, said bars and sides being integral extensions of each other and collectively defining a common convolution formed by a series of similar and substantially right angle bends.

2. In a cushion spring construction, the combination of spaced border frame structures, of a spring wire element in bridging relation to said frame structures, said element having a main bridging portion and terminal supporting ends, at least one of said ends being in the form of a fish mouth and provided to give spaced resilient support between said frame structures, said fish mouth comprising a first transverse torsion bar portion immediately adjacent one end of said main bridging portion, a first side sloping inwardly from said first bar to define a part of the fish mouth form and disposed at a plane substantially parallel to the plane of deflection of said bridging portion, a second transverse torsion bar in spaced substantially parallel relation to said first bar, a second side disposed in a plane substantially parallel to said first side and angularly disposed to said first side and oppositely directed to define another part of the fish mouth form and terminating in an attachment foot portion, said bars and sides being integral extensions of each other and collectively defining a common convolution formed by series of similar and substantially right angle bends, means attaching said first bar to one of said border frame structures, and means attaching said foot portion to the other of said border frame structures.

3. A spring element for spring cushion constructions for use in vehicle seats and backs and the like comprising a main bridging portion having terminal supporting ends, at least one of said ends being in the form of a fish mouth and having a first transverse torsion bar portion immediately adjacent one end of said main bridging portion and to which the top border frame of the spring cushion construction is adapted to be attached, a first side sloping inwardly from said first bar to define a part of the fish mouth form, a second transverse torsion bar in spaced relation to said first bar, a second side angularly disposed to said first side and oppositely directed to define another part of the fish mouth form and terminating in an attachment foot portion, said bars and sides being integral extensions of each other and collectively defining a common convolution formed by a series of similarly directed bends.

References Cited in the file of this patent

UNITED STATES PATENTS 2,815,797     Flint _____ Dec. 10, 1957